L. F. BOGIA.
ELECTRIC THERAPEUTIC APPARATUS.
APPLICATION FILED JULY 15, 1920.
1,384,716.
Patented July 12, 1921.
3 SHEETS—SHEET 1.
FIG. I.
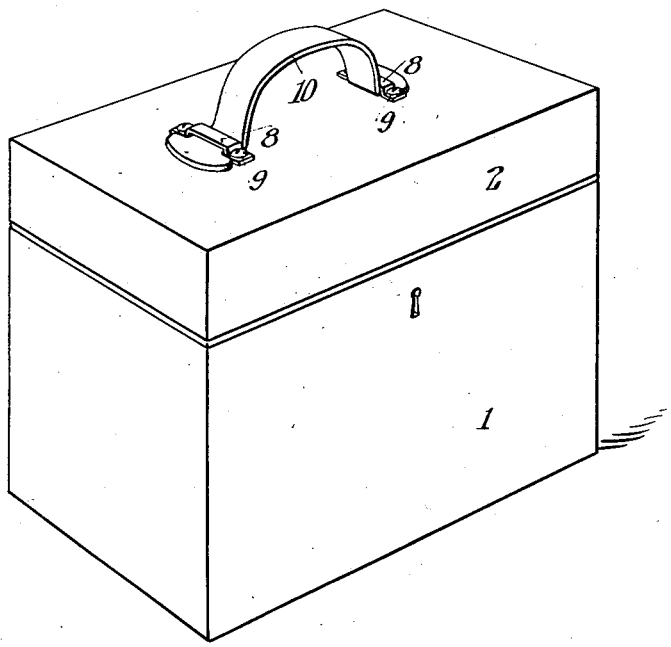
FIG. II.
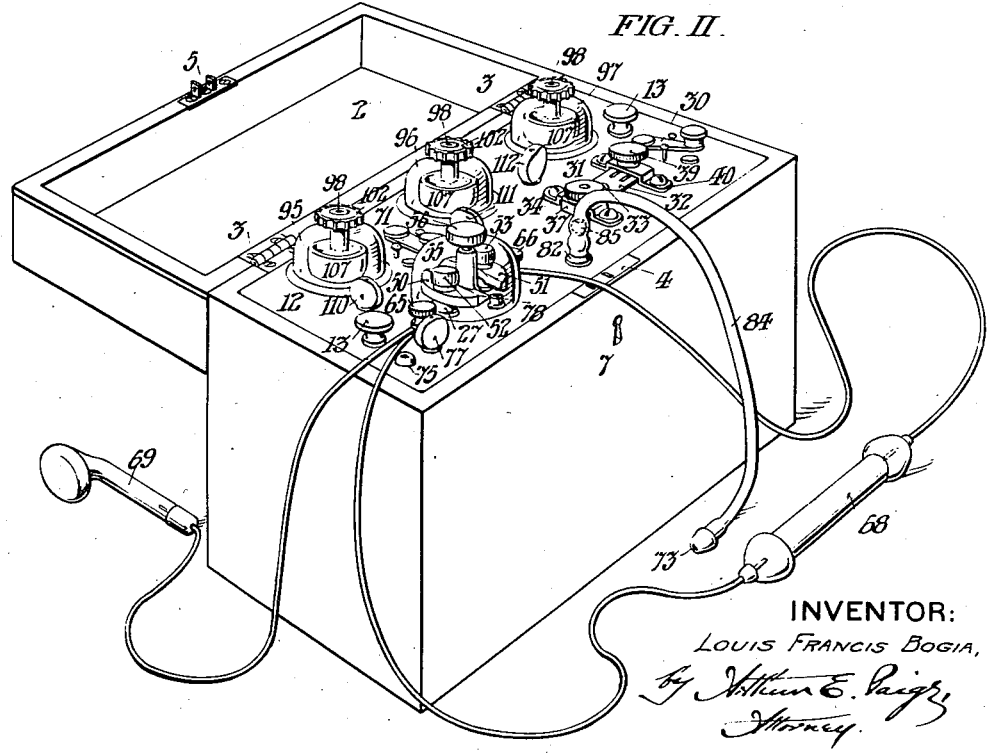
INVENTOR:
LOUIS FRANCIS BOGIA,
by Arthur E. Paige,
Attorney.

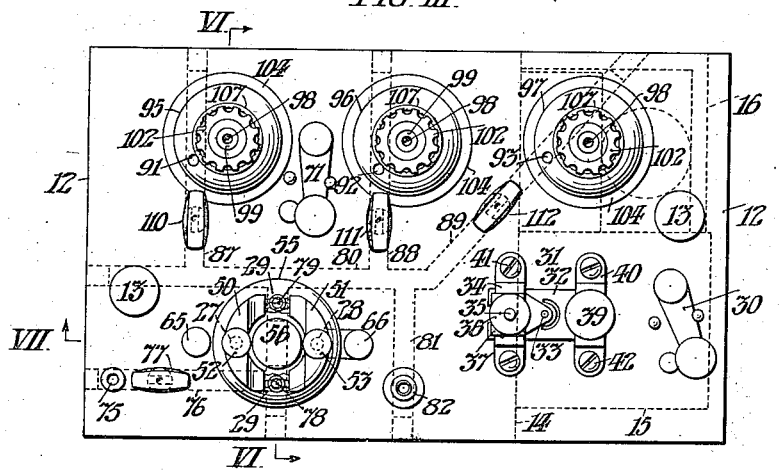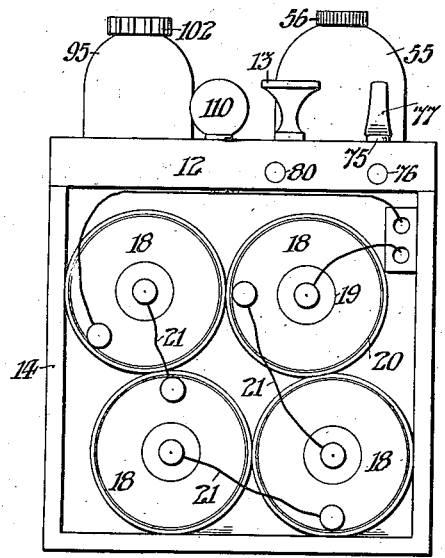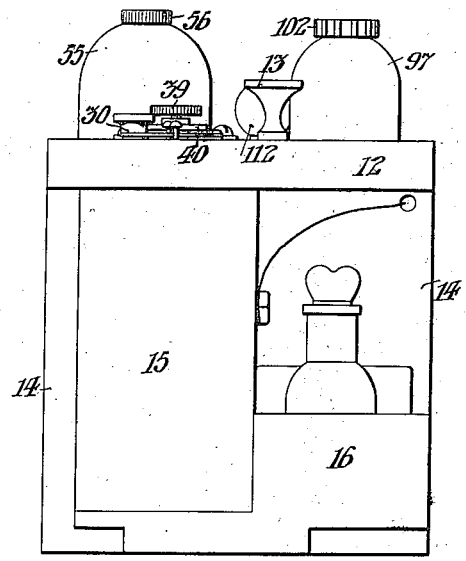

L. F. BOGIA.
ELECTRIC THERAPEUTIC APPARATUS.
APPLICATION FILED JULY 15, 1920.
1,384,716.
Patented July 12, 1921.
3 SHEETS—SHEET 3.
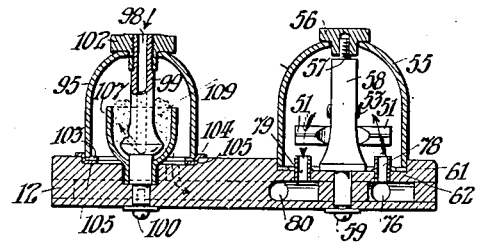
FIG. VI.
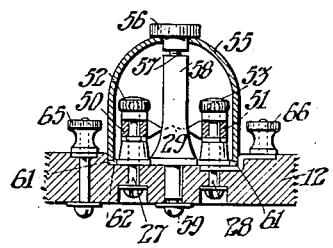
FIG. VII.
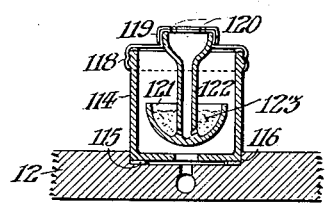
FIG. VIII.
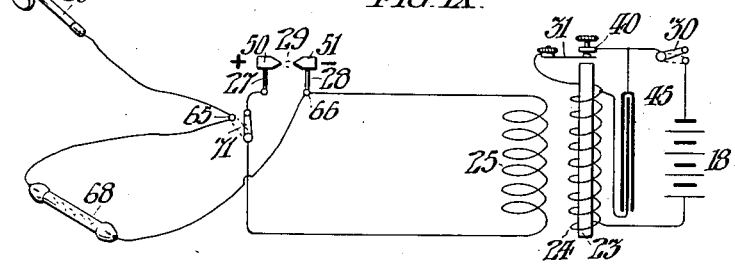
FIG. IX.
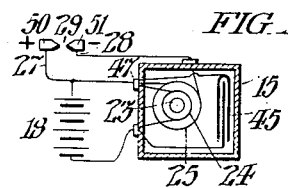
FIG. X.
INVENTOR:
LOUIS FRANCIS BOGIA,

UNITED STATES PATENT OFFICE.

LOUIS FRANCIS BOGIA, OF PHILADELPHIA, PENNSYLVANIA.

ELECTRIC THERAPEUTIC APPARATUS.

1,384,716.   Specification of Letters Patent.   Patented July 12, 1921.

Application filed July 15, 1920. Serial No. 396,519.

*To all whom it may concern:*

Be it known that I, LOUIS FRANCIS BOGIA, a citizen of the United States, residing at Philadelphia, in the county of Philadelphia and State of Pennsylvania, have invented a certain new and useful Improvement in Electric Therapeutic Apparatus, whereof the following is a specification, reference being had to the accompanying drawings.

My invention is of the class wherein radiant energy may be utilized to generate ozone by subjecting atmospheric air to the action of an electric spark, at a gap in an oscillatory circuit, and the apparatus hereinafter described includes means to mix medicinal vapors with the air in which the ozone is generated and deliver the mixture through an inhaler nozzle. However, the oscillations in said circuit may be extended in a vacuum tube, and radiant energy be directly applied by means of the latter. In said apparatus, the spark is produced by vibratory interruption of a primary battery current, in a circuit including a primary induction coil, in coöperative relation with a secondary induction coil in a separate circuit including the spark gap terminals. However, my invention includes a peculiar mechanical construction and arrangement of the spark gap terminals in an inclosure, having ports through which air may be directed to and from the spark gap, and conduits through which communication may be established with other inclosures adapted to contain volatile material, so that air containing ozone, or vapor, or both, may be supplied to an inhaler; which mechanical construction and arrangement is not dependent upon either the aforesaid specific electrical method or means for producing the spark. Moreover, I believe the construction and arrangement of the spark terminals hereinafter set forth to be novel, without limitation to the other features of my invention.

As hereinafter described, my invention includes an apparatus so organized as to be conveniently inclosed in a portable casing, the electrical elements of which include a battery comprising a group of dry cells connected in series relation; a primary induction coil in circuit with said battery; a vibratory interrupter included in that primary circuit; a manually operative switch whereby that primary circuit may be opened and closed; a secondary induction coil in coöperative relation with said primary coil, and spark terminals in said secondary circuit, adapted to direct sparks between them, and to form various fields of radiant energy. The adjunctive elements of the apparatus, for subjecting atmospheric air and medicinal vapor to the action of the spark at the gap between said terminals, include a transparent inclosure for the spark gap, and conduits leading to and from said inclosure, with ports in such relation to said gap that air is directed across the latter twice, viz., both in its ingress to and in its egress from said spark inclosure. The conduit leading to said spark inclosure may be opened to receive atmospheric air only, but has branches from distinct inclosures adapted to contain volatile matter, and said conduits have valve controlling means. The conduit leading from said spark gap inclosure is conveniently provided with an inhaler nozzle, which may be thus supplied with air which is ozonated or medicated or both.

My invention includes the various novel features of construction and arrangement hereinafter more definitely specified.

In said drawings; Figure I is a perspective view of a portable casing inclosing an organized apparatus conveniently embodying my invention, closed for transportation.

Fig. II is a perspective view of said casing shown in Fig. I, but opened and displaying said apparatus.

Fig. III is a plan view of the removable frame of said apparatus shown in Fig. II.

Fig. IV is an elevation of the left hand end of said frame, as shown in Fig. III.

Fig. V is an elevation of the right hand end of said frame, as shown in Fig. III.

Fig. VI is an irregular vertical cross sectional view of the top panel of said frame, taken on the line VI, VI in Fig. III, through the spark gap inclosure, shown at the right in Fig. IV, and through an inclosure adapted to contain volatile matter shown at the left in Fig. IV.

Fig. VII is a fragmentary vertical longitudinal sectional view of said panel, taken on the line VII in Fig. III, through said spark gap inclosure.

Fig. VIII is a fragmentary vertical sectional view showing a modified form of inclosure adapted to contain volatile material.

Fig. IX is a diagram indicating the relation of the electrical elements of said apparatus.

Fig. X is a diagrammatic plan view showing a modified relation of the primary and secondary induction coils and condenser embodied in said apparatus, shown in Figs. II to V inclusive, and indicating the connection of the same to the spark gap terminals.

Referring to Figs. I and II; the portable casing 1, which is conveniently formed of wood, has the cover 2 connected therewith by hinges 3 and adapted to be secured by the lock 4 engaging the hasp 5 when operated by a key inserted in the hole 7. Said cover 2 has the metal brackets 8 rigidly connected therewith by the screws 9 to retain the handle 10, conveniently formed of flexible leather, by which said casing and its contents may be carried.

Referring to Figs. II to VII inclusive; said casing 1 is provided with the removable frame including the top panel 12 which may be conveniently lifted out by the knobs 13. As indicated in Figs. III, IV and V; said frame includes three boxes which are rigidly connected with said panel 12, to wit, the battery box 14, the coil box 15, and the medicine box 16.

As shown in Fig. IV; said battery box 14 contains four cells 18, conveniently of the standard cylindrical form of dry type, each including a carbon element 19 and zinc element 20, and connected in series relation by the electrical conductors 21. As best indicated in Fig. X; said coil box 15 incloses a stationary iron core 23 surrounded by the primary induction coil 24 and encircled by the secondary induction coil 25. The opposite ends of the latter coil are respectively connected to the positive spark gap post 27 and negative spark gap post 28 which have the spark gap 29 between them. Means are provided to connect the opposite ends of said primary coil 24 to the respectively opposite terminals of the series of battery cells 18, and, as best indicated in Fig. IX, the circuit connecting said primary coil with said battery includes the manually operative switch 30, shown at the right hand side of Figs. II and III, and the vibratory interrupter 31 shown adjacent to said switch 30 in Figs. II and III and including the flexible trembler 32 which, as indicated in Figs. II and III, is hung upon the fulcrum screw 33 in the back bridge 34 and adjustably secured under variable tension in said bridge by the bolt 35, nut 36, and angle plate 37 so as to be vibrated by the magnetic attraction of said core 23 at a rate which is variable by adjustment of said nut 36 and by adjustment of the contact screw 39 which is in threaded engagement with the front bridge 40. As indicated in Fig. III; said bridges 34 and 40 are rigidly connected with said frame panel 12 by the screws 41 and 42 and the adjustments above contemplated are such that the rate of interruption of said primary coil circuit may be varied to attain the maximum sparking effect; such effect being extremely variable by minute adjustments of said nut 36 and contact screw 39. As indicated in Fig. X, I find it convenient to inclose in said coil box 15 a condenser 45 which, as indicated in Fig. IX is bridged across the terminals of said interrupter in the primary circuit. However, the effect of such condenser is to augment the spark at the gap 29 in the secondary circuit including said secondary induction coil 25.

In both of the arrangements shown respectively in Figs. IX and X, the primary and secondary circuits above described are coupled in the electrical sense, i. e., the respective coils are so placed that the circuits therethrough intersect lines of force in the field of the other coil. However, in the form indicated in Fig. IX, there is no mechanical connection between the two circuits, whereas, in the form indicated in Fig. X, the two circuits are not only electrically, but mechanically connected at the binding post 47. The latter arrangement effects a closer electrical coupling but has the disadvantage that under some circumstances the spark gap 29 in the secondary circuit may be short-circuited by accidental sparking across the primary circuit to which it is thus directly connected at the point 47. Moreover, it may be observed that in the arrangement shown in Fig. X, said condenser is bridged across the primary coil instead of across the interrupter as in Fig. IX.

Referring to Figs. II, III, VI and VII; said spark gap posts 27 and 28 are rigidly mounted in said frame panel 12 and carry at their upper ends the respective spark gap terminals 50 and 51, which are substantially semiannular carbon plates respectively removably connected with said posts 27 and 28 by the nuts 52 and 53. Said terminals are inclosed within the glass dome 55 which is detachably rigidly connected with said frame panel 12 by the nut 56 which engages the screw 57 upon the central column 58 which is formed of insulating material, such as hard rubber or other dielectric composition, conveniently rigidly connected with said panel by the screw 59 at the lower end of said column. Said inclosure 55 is thus normally held in hermetically sealed relation with said panel 12 by resting upon the resilient gasket 61 in the recess 62 in said panel as indicated in Figs. VI and VII, and the arrangement described suffices for the production of ozone in the manner hereinafter described. However, I find it convenient to provide auxiliary binding posts 65 and 66 exterior to said inclosure 55 and respectively electrically connected with said secondary coil 25, as indicated in Fig. IX, to facilitate the use of the special ray applicators 68 and 69, indicated in Figs. II and IX. Said applicators 68 and 69 may be glass vacuum tubes, the former adapted for the production of X-rays, and the latter for the production of what are known as "violet" rays. As indicated in Fig. IX; said applicator 68 is connected to both of said auxiliary terminals 65 and 66, but said applicator 69 is only connected to the positive terminal 65. For the maximum production of violet rays, at said applicator 69, it is desirable to eliminate all sparking at the gap 29. Therefore, I prefer to also provide the manually operative switch 71, indicated in Fig. IX, to break the circuit leading to the positive terminal 50 of said spark gap 29 to thus suppress all sparking within said inclosure 55 when it is desired to use the applicator 69 at its maximum efficiency.

The electrical equipment above described is utilized to ozonate atmospheric air or such air laden with medicinal vapors, and direct the same to the inhaler nozzle 73, shown in Fig. II, by providing a system of conduits leading to and from said spark gap 29 and conveniently including a series of ducts formed directly in said panel 12, and having valves controlling the same as best illustrated in Fig. III, wherein the air inlet 75, opening to the atmosphere at the upper surface of said panel, leads into the duct 76 having the rotary plug valve 77 controlling the admission of atmospheric air through the port 78 within said inclosure 55 as indicated in Figs. II and III. Said port 78 directs the incoming air across the spark gap at one side of said terminals 50 and 51, and the stream of air passes from said inclosure 55 through the port 79 which directs it across the spark gap at the opposite side of said terminals 50 and 51; so that the air is thus twice subjected to the action of the spark at said gap 29, and thus ozonated. The air escaping from said port 79 is directed through the main duct 80 and branch duct 81 to the coupling tube 82 which is rigidly mounted in said panel 12 as indicated in Figs. II and III, and is conveniently directed from said tube 82 to said nozzle 73 through the flexible rubber hose 84. Although it is unnecessary, I prefer to provide said hose 84 with the check valve 85, indicated in Fig. II, to prevent the patient from exhaling into the conduits aforesaid.

As indicated in Fig. III; said main duct 80 is provided with three branches 87, 88 and 89 leading from respective ports 91, 92 and 93 within the respective glass domes 95, 96 and 97 forming inclosures adapted to contain volatile material, the vapors from which mix with air directed into said inclosures through respective ports 98 at the tops thereof. As best shown at the left hand side of Fig. VI, said ports 98 are formed in tubular columns 99 which are rigidly connected with said panel 12 by respective screws 100. Each of said columns 99 is screw threaded at its upper end and is provided with a nut 102, whereby said inclosures 95, 96 and 97 are held in hermetically sealed relation with said panel 12 by resting upon resilient gaskets 103 in rings 104 set in recesses 105 in said panel, as indicated in Fig. VI. The arrangement described is such that atmospheric air may be admitted at all or any of said ports 98 and directed through the respective columns 99 into cups 107 which are conveniently formed of glass and held by said columns, as shown in Fig. VI, which cups may hold volatile material either in solid or liquid form. If in liquid form, such material may be poured upon glass wool 109, so as to be subjected to the action of the air to a greater extent than if placed directly in the cup. Said branch ducts 87, 88 and 89, leading to said main duct 80 from the respective inclosures 95, 96 and 97 as indicated in Fig. III, are respectively provided with rotary plug valves 110, 111 and 112; so that the air supplied through said conduits to said inhaler 73 may be either simply ozonated or be also mixed with volatile material from any or all of said inclosures 95, 96 and 97.

Referring to Fig. VI, it may be observed that it is impossible to remove the cup 107 without removing the column 99 which it encircles. Therefore, I find it convenient to provide inclosures for volatile material in which the cup for the material may be removed to be cleaned. For instance, as shown in Fig. VIII, the inclosure 114, conveniently formed of glass, merely rests upon the gasket 115 in the recess 116 in the panel 12 and said inclosure 114 is conveniently provided with the screw cover 118 having the rotary cap 119 whereby the air inlet ports 120 may be opened or closed. Said cover 118, which is conveniently formed of pressed sheet metal, carries the glass cup 121 by its tubular stem 122 through which air is directed to the volatile material 123 in said cup; the arrangement being such that both said cup and its inclosure may be instantly removed from the apparatus to be cleaned.

It may be observed that a medical or surgical practitioner desiring to effect treatments with ozonated or medicated air, or by special rays with the means heretofore commercially available, finds it necessary to not only buy separate and distinct apparatus for each such use, but to employ the electric apparatus in connection with a municipal or other electrical lighting or power system. Therefore, my improved apparatus above described is advantageous in that it may not only be packed, as shown in Fig. I, in a space of less than one-half cubic foot and readily transported, but is independent of any exterior source of energy and combines in one structure the means for producing oscillatory electrical currents adapted for X-ray, violet ray, and other special ray treatments, and for treatments with air either ozonated or medicated or both, at the will of the practitioner. The capacity of said apparatus to produce X-rays is of peculiar advantage, in that it enables the practitioner to immediately make visual inspection of fractured bones, without transporting the patient to a hospital or other institution where ordinary X-ray apparatus is employed.

However, although it is advantageous to employ as the electric generator in said apparatus, ordinary dry cells 18 which may be purchased even in small villages; it is to be understood that said apparatus may be suitably supplied with electric current otherwise generated. For instance, by a storage battery substituted for said dry cells, or by connection with a municipal or other electric supply system.

Therefore, I do not desire to limit myself to the precise details of construction and arrangement herein set forth, as it is obvious that various modifications may be made therein without departing from the essential features of my invention, as defined in the appended claims.

I claim:

1. Therapeutic apparatus including a casing; a frame removably mounted in said casing; a battery carried by said frame; an iron magnet core carried by said frame; a vibratory interrupter including a trembler arranged as an armature for said core; means arranged to adjustably vary the rate of vibration of said trembler; a primary induction coil, encircling said core; a manually operative switch; conductors including said interrupter, primary induction coil, and switch, in circuit with said battery; a condenser bridged across the terminals of said interrupter; a secondary induction coil in operative relation with said primary coil; spark gap terminals; conductors including said terminals in circuit with said secondary coil; an inclosure for said spark gap terminals; an inclosure for volatile material; means arranged to detachably secure said inclosures in connection with said frame; an inhaler; conduits arranged to direct atmospheric air through said spark gap to said inhaler, including a port within said spark gap inclosure arranged to direct the incoming air across the spark gap at one side of said terminals; another port in said spark gap inclosure arranged to direct the outgoing air across said spark gap at the opposite side of said terminals, and a main duct leading to said inhaler; an air inlet port leading to said inclosure for volatile material; conduits leading from a port within said inclosure for volatile material to said main duct, including a branch duct; and valves; whereby, said apparatus may be utilized to ozonate atmospheric air and such air laden with medicinal vapor and direct the same to said inhaler.

2. Therapeutic apparatus including a casing; a frame removably mounted in said casing; a battery carried by said frame; an iron magnet core carried by said frame; a vibratory interrupter; a primary induction coil; a manually operative switch; conductors including said interrupter, primary induction coil, and switch, in circuit with said battery; a condenser bridged across the terminals of said interrupter; a secondary induction coil in operative relation with said primary coil; spark gap terminals; conductors including said terminals in circuit with said secondary coil; an inclosure for said spark gap terminals; an inclosure for volatile material; means arranged to detachably secure said inclosures in connection with said frame; an inhaler; conduits arranged to direct atmospheric air through said spark gap to said inhaler, including a port within said spark gap inclosure arranged to direct the incoming air across the spark gap at one side of said terminals; another port in said spark gap inclosure arranged to direct the outgoing air across said spark gap at the opposite side of said terminals; and a main duct leading to said inhaler; an air inlet port leading to said inclosure for volatile material; conduits leading from a port within said inclosure for volatile material to said main duct, including a branch duct; and valves; whereby, said apparatus may be utilized to ozonate atmospheric air and such air laden with medicinal vapor and direct the same to said inhaler.

3. Therapeutic apparatus including a casing; a battery in said casing; an iron magnet core; a vibratory interrupter; a primary induction coil, encircling said core; a switch; conductors including said interrupter, primary induction coil, and switch, in circuit with said battery; a condenser in shunt relation to said interrupter; a secondary induction coil in operative relation with said primary coil; spark gap terminals; conductors including said terminals in circuit with said secondary coil; an inclosure for said spark gap terminals; an inclosure for volatile material; means arranged to secure said inclosures in said casing; an inhaler; conduits arranged to direct atmospheric air through said spark gap to said inhaler; conduits arranged to direct air from said inclosure for volatile material to said inhaler; and valves; whereby, said apparatus may be utilized to ozonate atmospheric air and such air laden with vapor and direct the same to said inhaler.

4. Therapeutic apparatus including a casing; a frame removably mounted in said casing; an iron magnet core carried by said frame; an interrupter; means arranged to adjustably vary the rate of operation of said interrupter; a primary induction coil, encircling said core; a switch; conductors including said interrupter, primary induction coil, and switch, in circuit with a source of electrical energy; a condenser in shunt relation to said interrupter; a secondary induction coil in operative relation with said primary coil; spark gap terminals; conductors including said terminals in circuit with said secondary coil; an inclosure for said spark gap terminals; an inclosure for volatile material; means arranged to detachably secure said inclosures in connection with said frame; an inhaler; conduits arranged to separately direct atmospheric air through said inclosures to said inhaler; and valves controlling said conduits.

5. Therapeutic apparatus including a casing; a frame removably mounted in said casing; an iron magnet core carried by said frame; an interrupter; means arranged to adjustably vary the rate of operation of said interrupter; a primary induction coil, encircling said core; a switch; conductors including said interrupter, primary induction coil, and switch, in circuit with a source of electrical energy; a secondary induction coil in operative relation with said primary coil; spark gap terminals; conductors including said terminals in circuit with said secondary coil; an inclosure for said spark gap terminals; an inclosure for volatile material; means arranged to detachably secure said inclosures in connection with said frame; an inhaler; conduits arranged to separately direct atmospheric air through said inclosures to said inhaler; and valves controlling said conduits.

6. Therapeutic apparatus including a casing; a frame removably mounted in said casing; an iron magnet core carried by said frame; an interrupter; means arranged to adjustably vary the rate of operation of said interrupter; a primary induction coil, encircling said core; a switch; conductors including said interrupter, primary induction coil, and switch, in circuit with a source of electrical energy; a secondary induction coil in operative relation with said primary coil; spark gap terminals; conductors including said terminals in circuit with said secondary coil; an inclosure for said spark gap terminals; an inclosure for volatile material; an inhaler; conduits arranged to separately direct atmospheric air through said inclosures to said inhaler; and valves controlling said conduits.

7. Therapeutic apparatus including a casing; a frame removably mounted in said casing; spark gap terminals on said frame; conductors including said terminals in an oscillatory electric circuit; an inclosure for said spark gap terminals; an inclosure for volatile material; means arranged to detachably secure said inclosures in connection with said frame; an inhaler; conduits arranged to direct atmospheric air through said spark gap to said inhaler, including a port within said spark gap inclosure arranged to direct the incoming air across the spark gap at one side of said terminals; another port in said spark gap inclosure arranged to direct the outgoing air across said spark gap at the opposite side of said terminals, and a main duct leading to said inhaler; an air inlet port leading to said inclosure for volatile material; conduits leading from a port within said inclosure for volatile material to said main duct, including a branch duct; and valves; whereby, said apparatus may be utilized to ozonate atmospheric air and such air laden with vapor and direct the same to said inhaler.

8. Therapeutic apparatus including a casing; a frame removably mounted in said casing; spark gap terminals on said frame; conductors including said terminals in an oscillatory electric circuit; an inclosure for said spark gap terminals; an inclosure for volatile material on said frame; an inhaler; conduits arranged to direct atmospheric air through said spark gap to said inhaler, including a port within said spark gap inclosure arranged to direct the incoming air across the spark gap at one side of said terminals; another port in said spark gap inclosure arranged to direct the outgoing air across said spark gap at the opposite side of said terminals; conduits arranged to direct vapor from said volatile material to said inhaler; and valves; whereby, said apparatus may be utilized to ozonate atmospheric air and such air laden with vapor and direct the same to said inhaler.

9. Therapeutic apparatus including a casing; spark gap terminals in said casing; conductors including said terminals in an oscillatory electric circuit; an inclosure for said spark gap terminals; an inclosure for volatile material; means arranged to detachably secure said inclosures in connection with said casing; an inhaler; conduits arranged to direct atmospheric air through said spark gap to said inhaler, including a port within said spark gap inclosure arranged to direct the incoming air across the spark gap at one side of said terminals; another port in said spark gap inclosure arranged to direct the outgoing air across said spark gap at the opposite side of said terminals; conduits arranged to direct vapor from said volatile materials to said inhaler; and valves; whereby, said apparatus may be utilized to ozonate atmospheric air and mix it with vapor and direct the same to said inhaler.

10. Therapeutic apparatus including a casing; spark gap terminals in said casing; conductors including said terminals in an oscillatory electric circuit; an inclosure for said spark gap terminals; an inhaler; conduits arranged to direct atmospheric air through said spark gap to said inhaler, including a port within said spark gap inclosure arranged to direct the incoming air across the spark gap at one side of said terminals; and another port in said spark gap inclosure arranged to direct the outgoing air across said spark gap at the opposite side of said terminals.

11. Therapeutic apparatus including a casing; a frame removably mounted in said casing; a battery carried by said frame; an iron magnet core carried by said frame; a vibratory interrupter including a trembler arranged as an armature for said core; means arranged to adjustably vary the rate of vibration of said trembler; a primary induction coil, encircling said core; a manually operative switch; conductors including said interrupter, primary induction coil, and switch, in circuit with said battery; a condenser in shunt relation to said interrupter; a secondary induction coil in operative relation with said primary coil; spark gap terminals; conductors including said terminals in circuit with said secondary coil; an inclosure for said spark gap terminals; an inclosure for volatile material; an inhaler; conduits in said frame arranged to direct atmospheric air through said spark gap to said inhaler, and conduits in said frame arranged to direct vapor from said inclosure for volatile material to said inhaler.

12. Therapeutic apparatus including a casing; a frame removably mounted in said casing; a battery carried by said frame; an iron magnet core carried by said frame; a vibratory interrupter including a trembler arranged as an armature for said core; means arranged to adjustably vary the rate of vibration of said trembler; a primary induction coil, encircling said core; a manually operative switch; conductors including said interrupter, primary induction coil, and switch, in circuit with said battery; a secondary induction coil in operative relation with said primary coil; spark gap terminals; conductors including said terminals in circuit with said secondary coil; an inclosure for said spark gap terminals; an inclosure for volatile material; an inhaler; conduits in said frame arranged to direct atmospheric air through said spark gap to said inhaler, and conduits in said frame arranged to direct vapor from said inclosure for volatile material to said inhaler.

13. Therapeutic apparatus including a frame; a plurality of glass inclosures removably mounted on said frame; means arranged to produce an electric spark in one of said inclosures; means arranged to hold volatile material in another of said inclosures; an inhaler; and means arranged to direct air from said inclosures to said inhaler, including a mixing conduit common to a plurality of said inclosures.

14. Therapeutic apparatus including a frame; a plurality of glass inclosures mounted on said frame; means arranged to produce an electric spark in one of said inclosures; means arranged to hold volatile material in another of said inclosures; an inhaler; and means arranged to direct air from said inclosures to said inhaler, including a mixing conduit common to a plurality of said inclosures.

15. Therapeutic apparatus including a frame; a plurality of glass inclosures mounted on said frame; means arranged to produce an electric spark in one of said inclosures; means arranged to hold volatile material in another of said inclosures; an inhaler; and means arranged to direct air from said inclosures to said inhaler.

16. A pair of spark gap terminals, each a substantially semiannular carbon plate; posts respectively supporting said terminals in spaced relation; whereby the sparking effect is localized at two regions of said terminals which are respectively substantially diametrically opposite to each other; and means arranged to direct air through both of said regions and thereby ozonate it.

17. A pair of spark gap terminals, each a substantially semiannular carbon plate; and posts respectively supporting said terminals in spaced relation; whereby the sparking effect is localized at two regions of said terminals which are respectively substantially diametrically opposite to each other.

In testimony whereof, I have hereunto signed my name at Philadelphia, Pennsylvania, this tenth day of June, 1920.

LOUIS FRANCIS BOGIA.

Witnesses:
WILLIAM E. PAIGE,
CAROLYN E. REUTER.